(12) United States Patent
Oda

(10) Patent No.: US 12,140,471 B2
(45) Date of Patent: Nov. 12, 2024

(54) WINDSHIELD FOR BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 444 days.

(21) Appl. No.: 17/765,789

(22) PCT Filed: Nov. 6, 2019

(86) PCT No.: PCT/JP2019/043470
§ 371 (c)(1),
(2) Date: Mar. 31, 2022

(87) PCT Pub. No.: WO2021/090397
PCT Pub. Date: May 14, 2021

(65) Prior Publication Data
US 2022/0333975 A1   Oct. 20, 2022

(51) Int. Cl.
*G01G 21/30*  (2006.01)
(52) U.S. Cl.
CPC .................................. *G01G 21/30* (2013.01)
(58) Field of Classification Search
CPC ............................. G01G 21/30; G01G 21/286
USPC ......................................................... 177/181
See application file for complete search history.

(56) References Cited

U.S. PATENT DOCUMENTS

| | | | |
|---|---|---|---|
| 5,058,692 A | 10/1991 | Melcher et al. | |
| 7,544,903 B2 * | 6/2009 | Hamamoto | G01G 21/286 177/180 |
| 11,460,339 B2 * | 10/2022 | Oda | E05F 15/56 |
| 11,473,966 B2 * | 10/2022 | Oda | E05F 15/56 |
| 11,846,163 B2 * | 12/2023 | Kash | F42D 1/043 |
| 2006/0016134 A1 | 1/2006 | Luchinger et al. | |
| 2016/0265964 A1 | 9/2016 | Kuhlmann et al. | |

FOREIGN PATENT DOCUMENTS

| | | |
|---|---|---|
| JP | 07-083744 A | 3/1995 |
| JP | 9-15031 A | 1/1997 |
| JP | 2003-262549 A | 9/2003 |
| JP | 2006-30188 A | 2/2006 |

OTHER PUBLICATIONS

International Search Report and Written Opinion issued in the corresponding Application No. PCT/JP2019/043470 Issued on Jan. 21, 2020.

\* cited by examiner

*Primary Examiner* — Jacques M Saint Surin
(74) *Attorney, Agent, or Firm* — Studebaker & Brackett PC

(57) ABSTRACT

A windshield for an electronic balance is provided which includes air cylinders incorporated inside as driving mechanisms, doors supported by a hanging manner by guide holes at least one end portion of which is open, and joint members interposed between the air cylinders and the doors. The joint members are also supported in a hanging manner in the guide holes, and upper portions of the joint members are joined to the air cylinders incorporated inside. The doors can be automatically opened and closed, and can be easily joined to and released from the driving mechanisms, and easily detached from the windshield by a simple structure.

7 Claims, 10 Drawing Sheets

Fig. 6

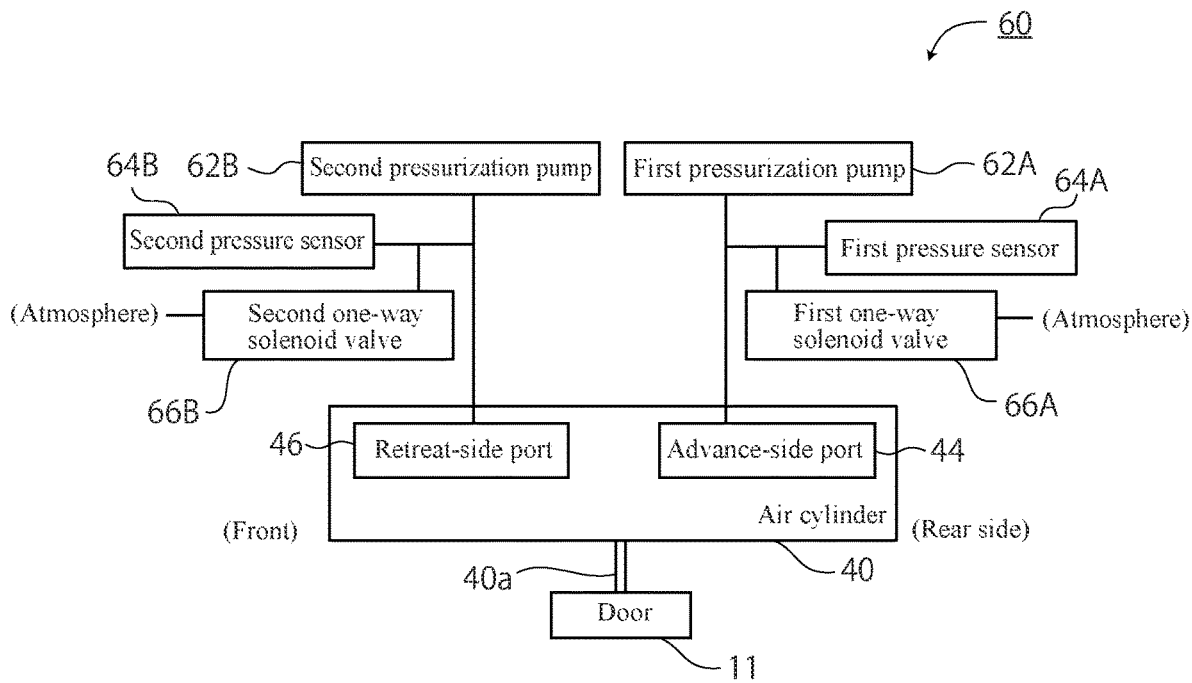

Fig. 7

|  | Door 11 | | Standard state | During calibration |
| --- | --- | --- | --- | --- |
|  | Automatic opening operation (move rearward) | Automatic closing operation (move forward) | Standard state (manually openable and closable) | During calibration |
| First one-way solenoid valve 66A | Open | Close | Open | Close |
| First pressurization pump 62A | Not operate | Pressurize | Not operate | Not operate |
| Second one-way solenoid valve 66B | Close | Open | Open | Close |
| Second pressurization pump 62B | Pressurize | Not operate | Not operate | Not operate |

WINDSHIELD FOR BALANCE

TECHNICAL FIELD

The present invention relates to a windshield for a balance which has a door to be automatically opened and closed, and more specifically, to a windshield the door of which can be easily detached.

BACKGROUND ART

Conventionally, a windshield having a door to be automatically opened and closed is used for an electronic balance with high weighing accuracy (for example, Patent Literature 1). By covering a weighing pan by the windshield, air flow around the weighing pan which is one of the factors for accuracy deterioration can be prevented, and by automatically opening and closing the door, workability of a weighing work is improved.

CITATION LIST

Patent Literature

[Patent Literature 1] Japanese Published Unexamined Patent Application No. H07-83744

DISCLOSURE OF INVENTION

Technical Problem

However, there is a problem in which it is difficult to detach a door that is automatically opened and closed. Usually, for preventing malfunction, a door driving mechanism is installed inside a windshield, so that a door to be joined to this mechanism is difficult to detach, and conversely, when the driving mechanism is exposed to the outside, the door is detachable, but degradation easily occurs due to external factors, which also easily leads to malfunction. The driving mechanism has a complicated structure, and handling of it requires some expertise, and mishandling makes the mechanism unusable. The inside enclosed by the windshield may be contaminated with a specimen when the specimen scatters, and sometimes requires cleaning, and cleaning is troublesome in the case where the door is difficult to detach.

The present invention was made in view of the problem described above, and an object thereof is to provide a windshield for a balance configured so that, in order to protect a driving mechanism, the driving mechanism is incorporated in the windshield to prevent a user from touching it, and a door to be automatically opened and closed can be easily detached by a simple configuration.

Solution to Problem

In order to solve the problem described above, in an aspect of the present disclosure, a windshield having a door to be automatically opened and closed by a driving mechanism incorporated inside, includes a joint member interposed between the driving mechanism and the door, and at least partially exposed to the outside of the windshield, the door is configured to be detachable, and further detachably joined to the joint member at an outside exposed portion of the joint member, and the door is opened and closed by the driving mechanism through the joint member. For protecting the driving mechanism, the driving mechanism is incorporated inside so as to prevent a user from touching it, the joint member is interposed between the driving mechanism and the door, the joint member is partially exposed to the outside of the windshield, and joined to the driving mechanism at a portion not exposed to the outside and joined to the door at the exposed portion, and accordingly, the door is made easily detachable. The driving mechanism incorporated inside is not exposed to the outside, so that a user does not touch the driving mechanism, so that there is no risk that the driving mechanism causes malfunction due to attaching/detaching of the door.

In an aspect, the door is supported on a rail at least one end portion of which is open, and is configured to open and close by being driven by the driving mechanism to slide along the rail. At least one end portion of the rail is open, so that by releasing joining between the joint member and the door, the door can be moved to the rail end portion and detached.

In an aspect, the driving mechanism is an air cylinder disposed parallel to the door, and the joint member is joined to a piston rod of the air cylinder, and further, detachably joined to the door at the portion exposed to the outside from the windshield. Since an air cylinder is used as the driving mechanism, a structure is made in which a piston rod moves according to door opening and closing. When another structure, for example, a motor is used as the driving mechanism, the motor itself does not move but moves the door indirectly by a timing belt, etc., by using a pulley, etc. Further, even when the motor is exposed to the outside, the belt as a power mediating member cannot be easily detached, and if it is detached once, it is difficult to attach the belt again. The same applies to the case of using a rack-and-pinion structure. Further, the power mediating member is usually made of rubber, so that if the member is exposed, it greatly degrades due to ultraviolet rays and oxidation. In the case of using an air cylinder, the air cylinder itself (piston rod) moves and can directly drive the joined door, so that the power mediating member is not required. Therefore, only by interposing the joint member between the air cylinder and the door, the driving mechanism and the door can be easily joined/released.

In an aspect, the door is supported in a hanging manner by a guide hole at least one end portion of which is open, and the joint member is disposed in a state where a portion of the joint member is inserted through the guide hole, and is joined at the portion inserted through the guide hole to the incorporated driving mechanism, and is joined at a portion not inserted through the guide hole to the door. The joint member is exposed to the inside at the portion inserted through the guide hole, and exposed to the outside at a portion not inserted through the guide hole. By supporting the door in a hanging manner from the guide hole, and disposing the joint member in a state where a portion of the joint member is inserted through the guide hole, the joint member can be exposed to the outside through this hole.

Advantageous Effects of Invention

According to the configuration described above, a windshield for a balance the door of which to be automatically opened and closed can be detached by a simple configuration is provided.

BRIEF DESCRIPTION OF DRAWINGS

FIG. 6 is a block diagram of a door opening and closing mechanism according to the embodiment.

FIG. 7 is an operation chart of the door opening and closing mechanism according to the embodiment.

DESCRIPTION OF EMBODIMENTS (Configuration of Electronic Balance with Windshield)

Figure 1:
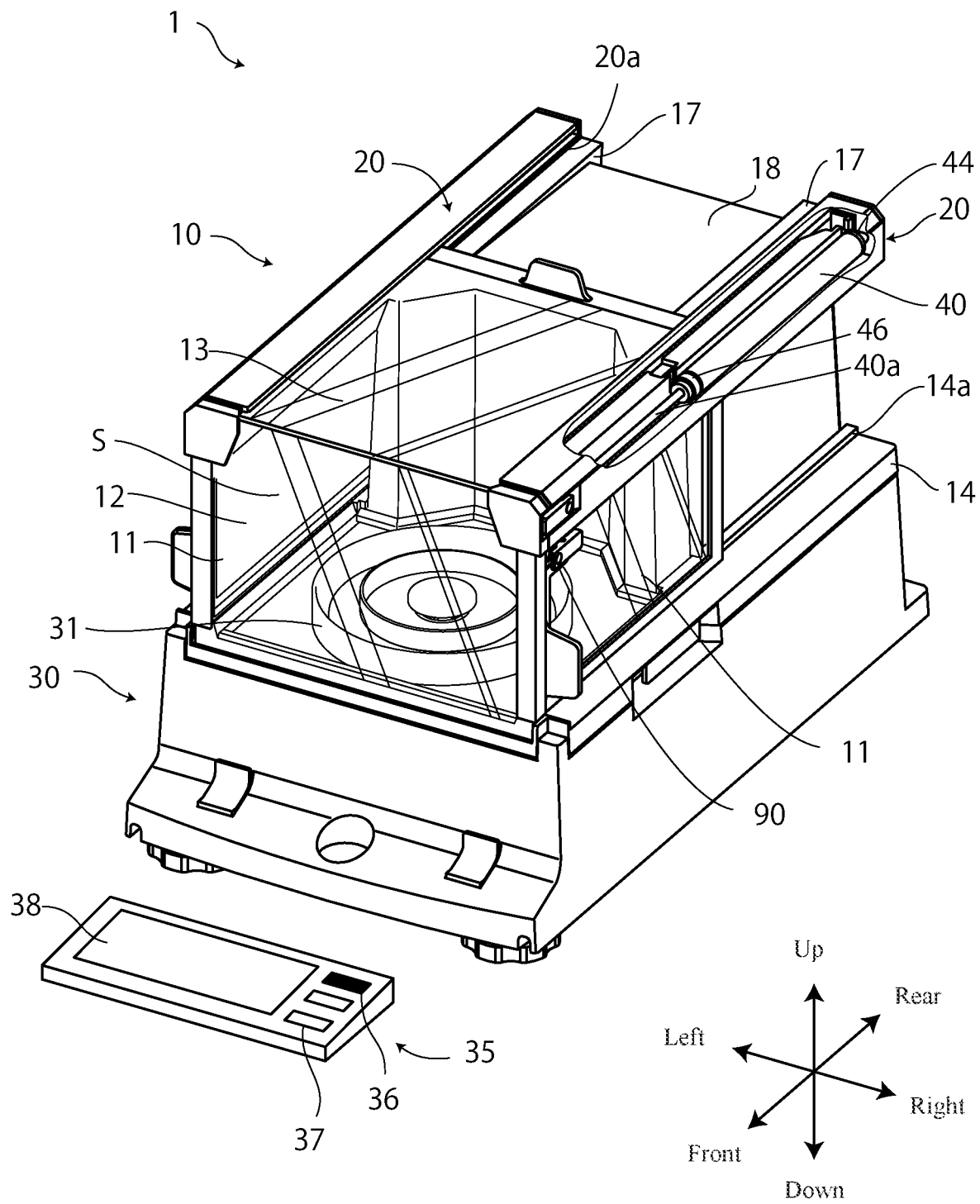
FIG. 1 is a partially broken-away perspective view of an electronic balance with a windshield according to an embodiment.

Hereinafter, preferred embodiments relating to a configuration of the present disclosure are described with reference to the drawings. FIG. 1 is a partially broken-away perspective view of an electronic balance 1 with a windshield according to the embodiment.

As illustrated in FIG. 1, the electronic balance 1 with a windshield includes an electronic balance 30 and a windshield 10. The balance main body 30 includes a weighing pan 31 for placing a specimen on its upper surface. The windshield 10 is disposed on an upper surface of the balance 30 so as to enclose the surrounding of the weighing pan 31, and prevents air flow around the weighing pan 31, for example, wind from an air conditioner, breath of a person at the time of weighing, and air flow generated when a person walks, etc., from acting as a wind pressure on a load-applied portion centered on the weighing pan 31 and influencing weighing.

The windshield 10 is detachably attached to the electronic balance 30, and for an attaching and detaching mechanism, a configuration conventionally known, for example, the configuration disclosed in Japanese Published Unexamined Patent Application No. 2008-216047 is used, however, without limitation to this, a configuration in which the windshield 10 and the electronic balance 30 are integrated in a non-separable manner is also possible.

The windshield 10 has a bottomless box shape, and has a front glass 12 at a front surface, a box-shaped case 18 at a back portion, doors 11 at portions of left and right side walls, and an upper surface door 13 at the upper surface, and as a space defined by these, a weighing chamber S having a rectangular parallelepiped shape is formed inside.

The doors 11 can respectively move forward and rearward along rails 14a provided on a lower frame 14 as a frame member at a lower portion of the windshield 10, and the upper surface door 13 can move forward and rearward along rails 20a provided in cylinder boxes 20 on left and right sides of an upper portion of the windshield 10.

The front glass 12, the upper surface door 13, and the left and right doors 11 are made of a transparent glass or resin so that an internal state can be observed. To each of the upper surface door 13 and the doors 11, a handle 15 that assists sliding is attached. The upper surface door 13 can be manually opened and closed, and the doors 11 at the left and right side surfaces are configured so that they can be automatically and manually opened and closed.

A control panel 35 is for operating the balance main body 30 and the windshield 10, and is provided separately from the balance main body 30 and the windshield 10. This is to prevent vibration caused by an operation such as pushing on a switch from influencing weighing. The control panel is a separate body, so that a user can freely arrange the control panel at a position easy to operate. Although the control panel has a wireless communication function for signal transmission and reception, information may be transmitted and received by wire.

The control panel 35 includes, on an upper surface thereof, a display unit 38 to display weighing results and states, switches 37 for operation, and an infrared sensor 36. The infrared sensor 36 is an opening and closing switch of the doors 11, and only by holding a hand over the infrared sensor, can the doors 11 be automatically opened and closed. A press switch may be provided in place of the infrared sensor 36, and a configuration in which both of a press switch and the infrared sensor 36 are provided is also preferable. To the infrared sensor 36, a balance operating function other than the door 11 opening and closing function may be assigned. It is also possible that two left and right infrared sensors 36 are provided and configured to respectively open and close corresponding doors 11.

Upper frames 17 are provided to constitute left and right upper sides of the windshield 10 having a substantially rectangular parallelepiped shape, and the cylinder boxes 20 are engaged with the upper frames 17 so that their longitudinal directions match. The cylinder box 20 is a hollow housing, and inside, an air cylinder 40 serving as a driving means to open and close the door 11 is housed.

The air cylinder 40 is a double-acting type, and both of the forward and backward strokes of reciprocating motion of a piston inside the air cylinder 40 are made by air pressure, so that ports to feed air to the inside of the air cylinder 40 are provided at two positions. A retreat-side port 46 for making the piston move rearward by fed air is provided at the front side of the air cylinder 40, and an advance-side port 44 for making the piston move forward is provided at the rear side. To these ports 44 and 46, air tubes not illustrated are connected, and linked to the inside of the case 18.

Inside the case 18, pumps serving as drive sources of the air cylinder 40 and solenoid valves to control the flow and stoppage of air, and a control unit 34 to control these pumps and solenoid valves, etc., are housed.

(Structure of Door)

Figure 2:
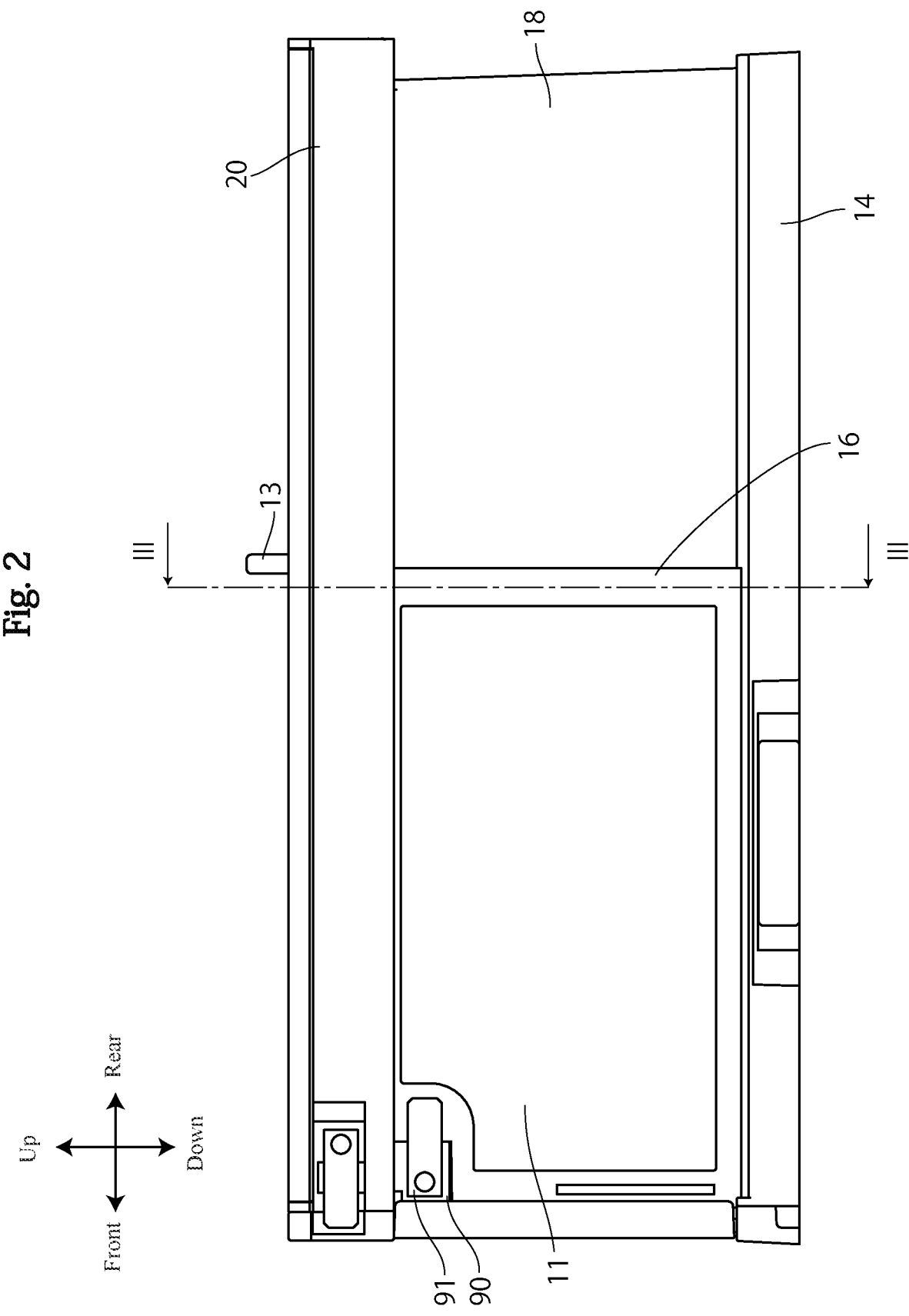
FIG. 2 is a right side view of the windshield.
Figure 3:
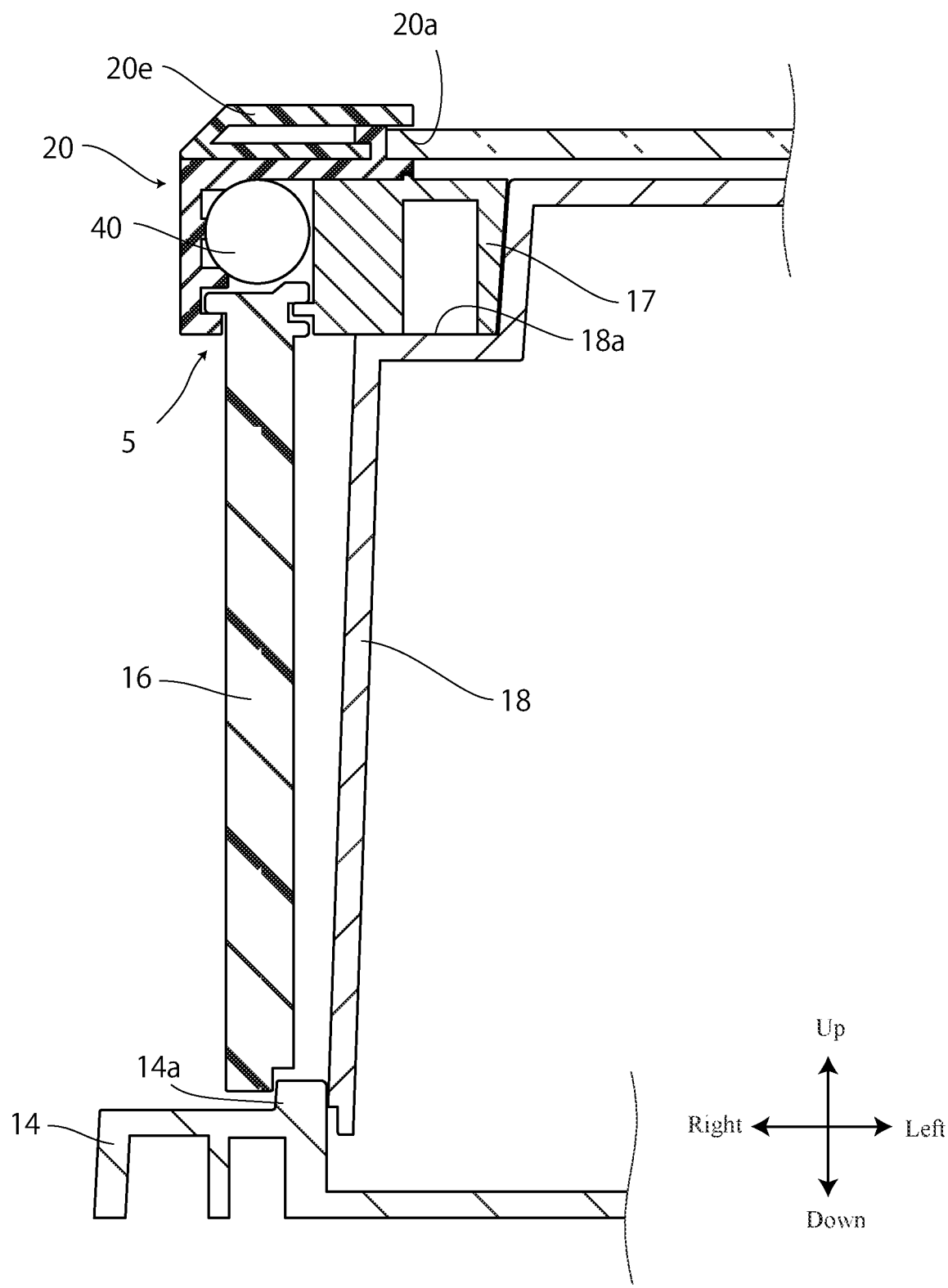
FIG. 3 is an end face view taken along line III-III in FIG. 2.
Figure 4:
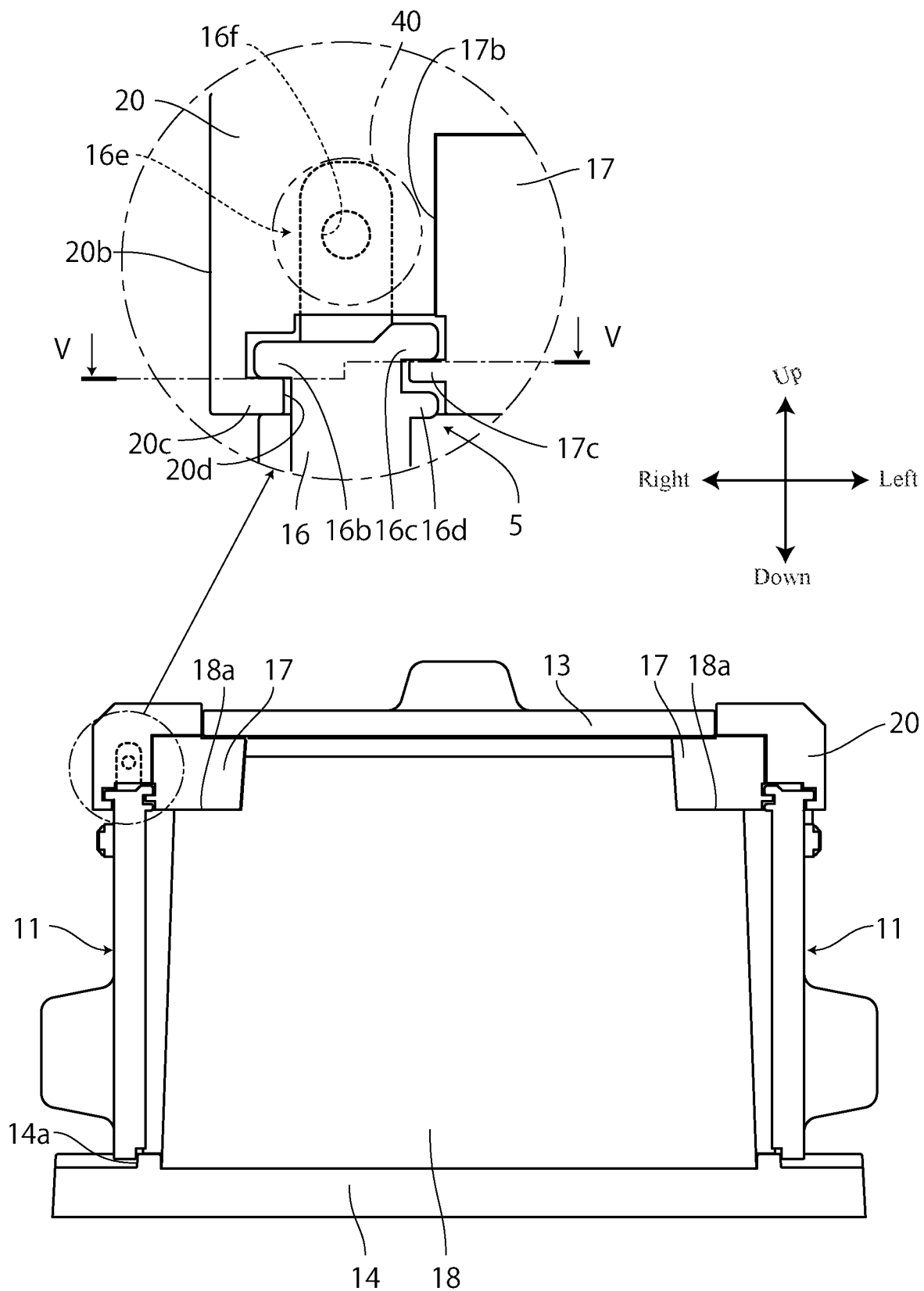
FIG. 4 is a back view of the windshield.
Figure 5:
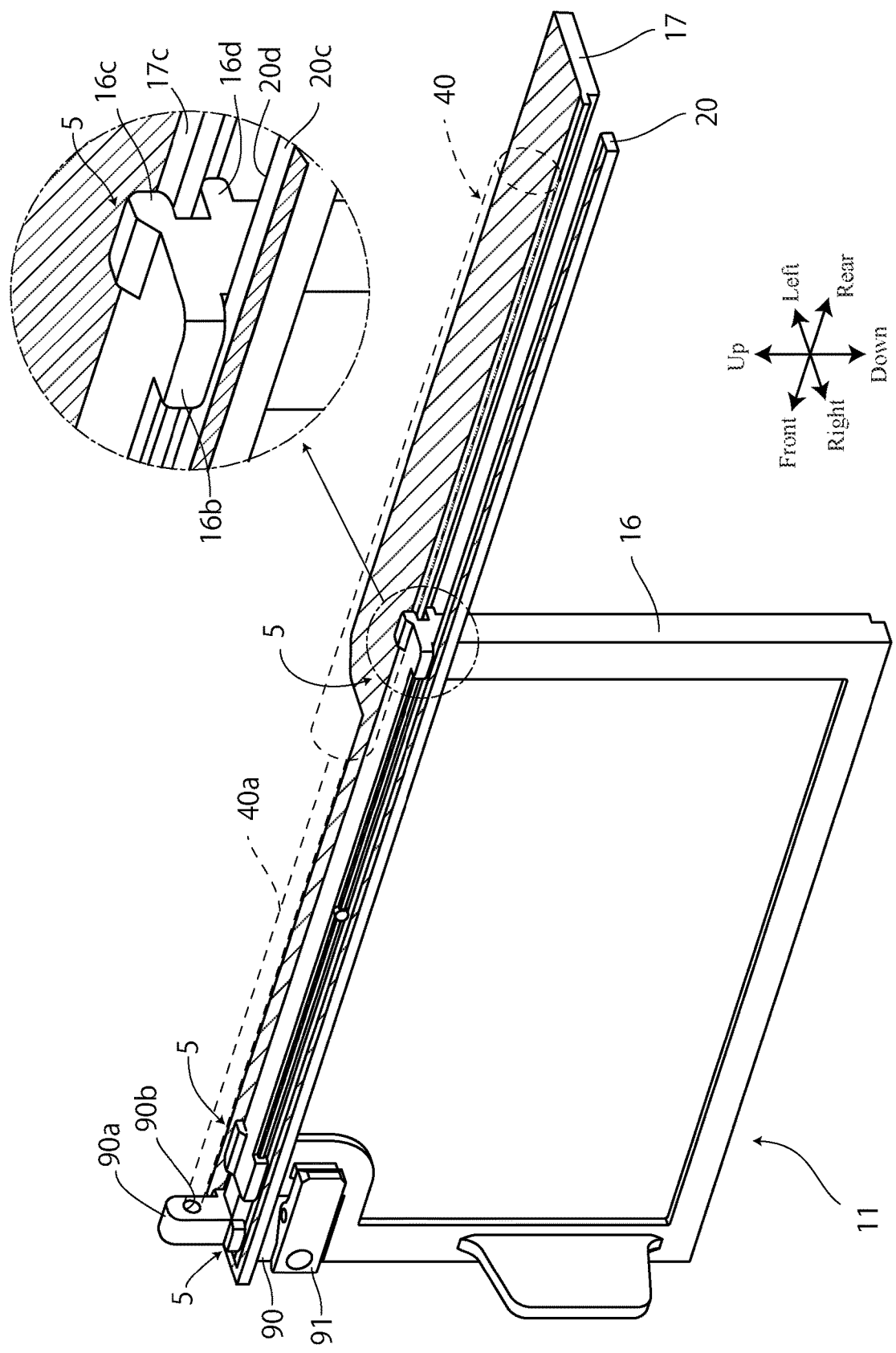
FIG. 5 is an explanatory view to describe a door opening and closing mechanism, and is a partial cross-sectional perspective view with a part broken away along line V-V in FIG. 4.

First, an automatic opening and closing mechanism of the door 11 and a structure of the door 11 will be described. FIG. 2 is a right side view of the windshield 10, FIG. 3 is an end view taken along line in FIG. 2, and FIG. 4 is a back view of the windshield 10. FIG. 5 is an explanatory view to describe a shape and a configuration of the door 11, illustrating only the door 11, the cylinder box 20, and the upper frame 17, and is a partial cross-sectional perspective view of the cylinder box 20 and the upper frame 17 cut along line V-V in FIG. 4.

As illustrated in FIG. 2, in a corner portion at an upper front end of the door 11, a joint member 90 is disposed. The joint member 90 has a first latching member 91, and the door 11 is detachably joined to the joint member 90 by the first latching member 91. In a state where the door 11 and the joint member 90 are joined to each other, they move integrally. An upper portion of the joint member 90 is joined to the air cylinder 40 serving as a driving means of the door 11 inside the cylinder box 20, and the door 11 is connected to the air cylinder 40 through the joint member 90 and is opened and closed by driving of the air cylinder 40. First, a structure and the automatic opening and closing mechanism of the door 11 will be described on the assumption that the door 11 and the joint member 90 are in a state where they are joined to each other and move integrally, and an attaching and detaching mechanism of the joint member 90 will be described later.

As illustrated in FIG. 3, a recess portion is formed in an inner wall of the cylinder box 20 to match the shape of the air cylinder 40, and in this recess portion, the air cylinder 40 is engaged and fixed. The cylinder box 20 includes a cover 20e at an upper portion, and a rail 20a is formed by using the cover 20e as a presser.

As illustrated in FIGS. 4 and 5, a pair of upper frames 17 are substantially rectangular parallelepiped members that are long in one direction, and are disposed along concave portions 18a provided at left and right edge portions of an upper portion of the case 18, and constitute frame members of at upper portions of the windshield 10. The cylinder box 20 has an external form of a pushed-out reversed L shape in a back view, and an upper side portion is placed on an upper surface of the upper frame 17, an inner surface comes into contact with a side surface of the upper frame 17, and a right-angle portion of the reversed L shape engages with a corner portion of the upper frame 17, and the cylinder box 20 is fixed so that its longitudinal direction matches the longitudinal direction of the upper frame 17.

The cylinder box 20 does not have a bottom surface (refer to FIG. 3), and an upper portion of the door 11 is disposed to enter the inside of the cylinder box 20. At a lower end portion of an outer side surface 20b of the cylinder box, an inner flange portion 20c is formed inward over the entire length in the longitudinal direction. In addition, at a lower portion of an outer side surface 17b of the upper frame 17, a projecting portion 17c extending over the entire length in the longitudinal direction (front-rear direction) is formed to face the inner flange portion 20c.

The door 11 is held by a holder 16 provided at an entire outer edge portion. At two front and rear positions of an upper portion of the holder 16, holding portions 5 projecting in a thickness direction (left-right direction) of the door 11 are formed orthogonal to a sliding direction (front-rear direction) of the door 11. The upper portion of the door 11 enters a slit (hereinafter, referred to as a guide hole 20d) formed between the inner flange portion 20c and the projecting portion 17c, and the holding portion 5 of the holder 16 engages with the inner flange portion 20c and the projecting portion 17c, and holds the door 11 in a hanging manner. Accordingly, the door 11 is disposed to separate from the upper surface of the lower frame 14 and the upper surface of the rail 14a formed on the lower frame 14, and is held slidably along the guide hole 20d. A conventional sliding type door configuration has a problem in which when dust and sand, etc., enter the rail 14a, a sliding resistance when opening and closing the door 11 increases, which makes it difficult to open and close the door 11, but this is prevented by hanging the door 11 itself from the upper portion.

The inner flange portion 20c and the projecting portion 17c are formed by not directly facing each other but being slightly offset in the up-down direction, and the projecting portion 17c at the inner side is at a position slightly higher than the inner flange portion 20c. This is to hold the door 11 in a stable posture by making slightly higher the inner side of the holding portion to incline the door 11 inward and bringing a lower portion of the door 11 into contact with the side surface of the rail 14a rather than the holding portion 5 projecting to the left and right at the same height from the upper portion of the door 11 and causing a state where the door 11 easily wobbles both leftward and rightward. With this configuration, the door 11 does not wobble when it moves, and when opening and closing the door 11, the door 11 can be moved in a state of being kept in the same posture, and unexpected sliding of the door 11 can be prevented.

The holding portion 5 of the door 11 is formed to match the shapes and dispositions of the inner flange portion 20c and the projecting portion 17c, and consists of a first engagement portion 16b formed to project toward the inner flange portion 20c side disposed at the outer side, a second engagement portion 16c formed to project toward the projecting portion 17c side disposed at the inner side, and a third engagement portion 16d formed by being offset to the lower side of the second engagement portion 16c.

The third engagement portion 16d is formed to sandwich the projecting portion 17c between the third engagement portion 16d and the second engagement portion 16c, but the third engagement portion 16d is spaced from a bottom surface of the projecting portion 17c.

In the present embodiment, a hanging support form of the door 11 is configured in this way, however, a form in which the holding portion 5 formed into a T shape is engaged in a slit formed in a flat plate may also be used.

As illustrated in FIG. 5, on the joint member 90 disposed at the front end upper portion of the door 11, the holding portion 5 is also formed, and the joint member 90 is also slidably supported by the guide hole 20d in a hanging manner same as with the door 11. At an upper portion of the joint member 90, a driving mechanism coupling portion 90a projecting to a higher position than an upper surface of the holder 16 is formed, and further, in the center of the driving mechanism coupling portion 90a, a coupling hole 90b along the sliding direction of the door 11 is formed. A tip end of a piston rod 40a extending from the piston of the air cylinder 40 is fitted and fixed into the coupling hole 90b. The piston (piston rod 40a) is connected to the door 11 through the joint member 90, and by the piston being moved forward and rearward by air, the joint member 90 and the door 11 joined to this joint member slide along the guide hole 20d. In this way, the door 11 opens and closes by using the air cylinder 40 as a driving means.

Even in the state where the holder 16 is engaged with the inner flange portion 20c, the air cylinder 40 does not come into contact with the upper surface of the holder 16, and is fixed at a distance from the holder 16 (refer to FIG. 3), and the air cylinder 40 hence does not obstruct movement of the door 11. The driving mechanism coupling portion 90a projects to a higher position than the upper surface of the holder 16, however, because the driving mechanism coupling portion 90a is fixed to the tip end of the piston rod 40a, the driving mechanism coupling portion 90a does not enter the lower side of the air cylinder 40, and a path of the driving mechanism coupling portion 90a is secured inside the cylinder box 20, so that the cylinder box 20 and the driving mechanism coupling portion 90a do not interfere with each other.

The air cylinder 40 serving as a driving means of the door 11 is disposed substantially right above the door 11 so as to be parallel to the sliding direction of the door 11. The joint member 90 and the holder 16 are integrated with each other, and the joint member 90 is further joined to the air cylinder 40. By using not a motor but the air cylinder 40 as a driving means, the door 11 can be directly moved without a pulley and a rubber belt, etc. Therefore, force transmissibility is high, the door 11 can be opened and closed with small force, and the door 11 can be smoothly opened and closed.

(Block Diagram)

The automatic opening and closing mechanism of the door 11 will be described in detail. FIG. 6 is a block diagram illustrating an opening and closing mechanism 60 of the door 11 of the electronic balance 1 with a windshield. The opening and closing mechanism 60 is a mechanism for opening and closing the door 11, and each of the left and right doors 11 includes the opening and closing mechanism 60, and is controlled independently by the connected opening and closing mechanism 60. In the present embodiment, a pump that moves the piston inside the air cylinder 40 forward (advances) (further, the piston rod 40a extending from the piston) and a pump that moves the piston rearward (retreats) exist separately.

The opening and closing mechanism 60 includes a first pressurization pump 62A, a second pressurization pump 62B, a first pressure sensor 64A, a second pressure sensor 64B, a first one-way solenoid valve 66A, a second one-way solenoid valve 66B, and an air cylinder 40. The air cylinder 40 is connected to the door 11 through the piston rod 40a.

Both of the first pressurization pump 62A and the second pressurization pump 62B are air pumps. These pumps are drive sources of the air cylinder 40, and compress air and feed the compressed air to the air cylinder 40, and move the piston by air pressure to move the door 11.

Outlet sides of the first one-way solenoid valve 66A and the second one-way solenoid valve 66B are opened to the atmosphere, and by opening and closing the valves, the flow and stoppage of air are controlled.

The first pressure sensor 64A monitors a pressure of air discharged from the first pressurization pump 62A, and the second pressure sensor 64B monitors a pressure of air discharged from the second pressurization pump 62B. Because the two pressure sensors 64A and 64B are respectively connected to the air cylinder 40, the pressure sensors 64A and 64B in other words monitor a pressure of air to be supplied to the air cylinder 40 and a pressure of air inside the air cylinder 40.

To the advance-side port 44 provided at the rear side of the air cylinder 40, the first pressurization pump 62A is connected. This connection has a branch halfway, and the first pressure sensor 64A and the first one-way solenoid valve 66A are further connected. To the retreat-side port 46 provided at the front side of the air cylinder 40, the second pressurization pump 62B is connected. This connection has a branch halfway, and the second pressure sensor 64B and the second one-way solenoid valve 66B are connected to this branch.

Operations of the respective components of the opening and closing mechanism 60 are controlled by the control unit 34 disposed inside the case 18.

(Operation when Opening and Closing Door)

Next, operations of the respective components when the door 11 is automatically opened and closed are described. FIG. 7 is an operation chart of the opening and closing mechanism 60.

First, in a "standard state" in which a user can manually open and close the door 11, neither of the first pressurization pump 62A and the second pressurization pump 62B is activated, and the first one-way solenoid valve 66A and the second one-way solenoid valve 66B are open. Because neither of the pressurization pumps (62A and 62B) operates, and both of the one-way solenoid valves (66A and 66B) are opened and communicate with the atmosphere, no load is applied from the air cylinder 40, and the door 11 can be smoothly manually opened and closed.

When a command to "open/close door" is input from the infrared sensor 36 of the control panel 35, the control unit 34 commands the respective components to operate.

In a case of an "automatic opening operation" to open the door 11, that is, in a case where the piston of the air cylinder 40 is moved rearward, the second one-way solenoid valve 66B is closed, and pressurization of the second pressurization pump 62B is started. At this time, the first pressurization pump 62A is not activated, and the first one-way solenoid valve 66A is open, so that the piston is moved rearward by an air pressure, and the door 11 is opened.

When the door 11 fully opens, the air pressure rapidly increases, so that when this change is detected by the second pressure sensor 64B, the second pressurization pump 62B is stopped, the second one-way solenoid valve 66B is opened, and the compressed air inside the air cylinder is released to the atmosphere, and the mechanism returns to the standard state.

In a case of an "automatic closing operation" to close the door 11, that is, in a case where the piston of the air cylinder 40 is moved forward, the first one-way solenoid valve 66A is closed, and pressurization of the first pressurization pump 62A is started. At this time, the second pressurization pump 62B does not operate, and the second one-way solenoid valve 66B is open, so that the piston is moved forward by an air pressure, and the door 11 is closed.

When the door 11 fully closes, the air pressure rapidly increases again, so that when this change is detected by the first pressure sensor 64A, the first pressurization pump 62A is stopped, the first one-way solenoid valve 66A is opened, and the compressed air inside the air cylinder is released to the atmosphere, and the mechanism returns to the standard state.

On the other hand, when calibration is performed, the first one-way solenoid valve 66A and the second one-way solenoid valve 66B are closed. Both of the one-way solenoid valves (66A and 66B) are closed, the piston of the air cylinder 40 can move neither forward nor rearward, and the door 11 is locked. This is to prevent the door from being unexpectedly opened during calibration operation and influencing calibration. After the calibration is finished, the first one-way solenoid valve 66A and the second one-way solenoid valve 66B are opened, and the mechanism returns to the standard state.

In this way, the door 11 is automatically locked during calibration operation. The door 11 may be configured to be locked according to a command from the switch 37. Not only during calibration, the door 11 can also be locked during transportation.

When one pressurization pump operates, the other pressurization pump does not operate, and only one solenoid valve is closed, and the other solenoid valve is opened and communicates with the atmosphere. When the pump that has been operating stops, the closed solenoid valve opens and communicates with the atmosphere. In other words, all of the one-way solenoid valves are configured to open and communicate with the atmosphere when the pressurization pumps stop. After the door 11 is automatically opened/closed, air is released to the atmosphere, and the load applied to the door 11 is eliminated, and it becomes possible to smoothly manually move the door 11. The door 11 is automatically openable and closable, while after it is automatically opened/closed, manual opening and closing are enabled immediately without any special operation.

(Flowchart)

Figure 8:
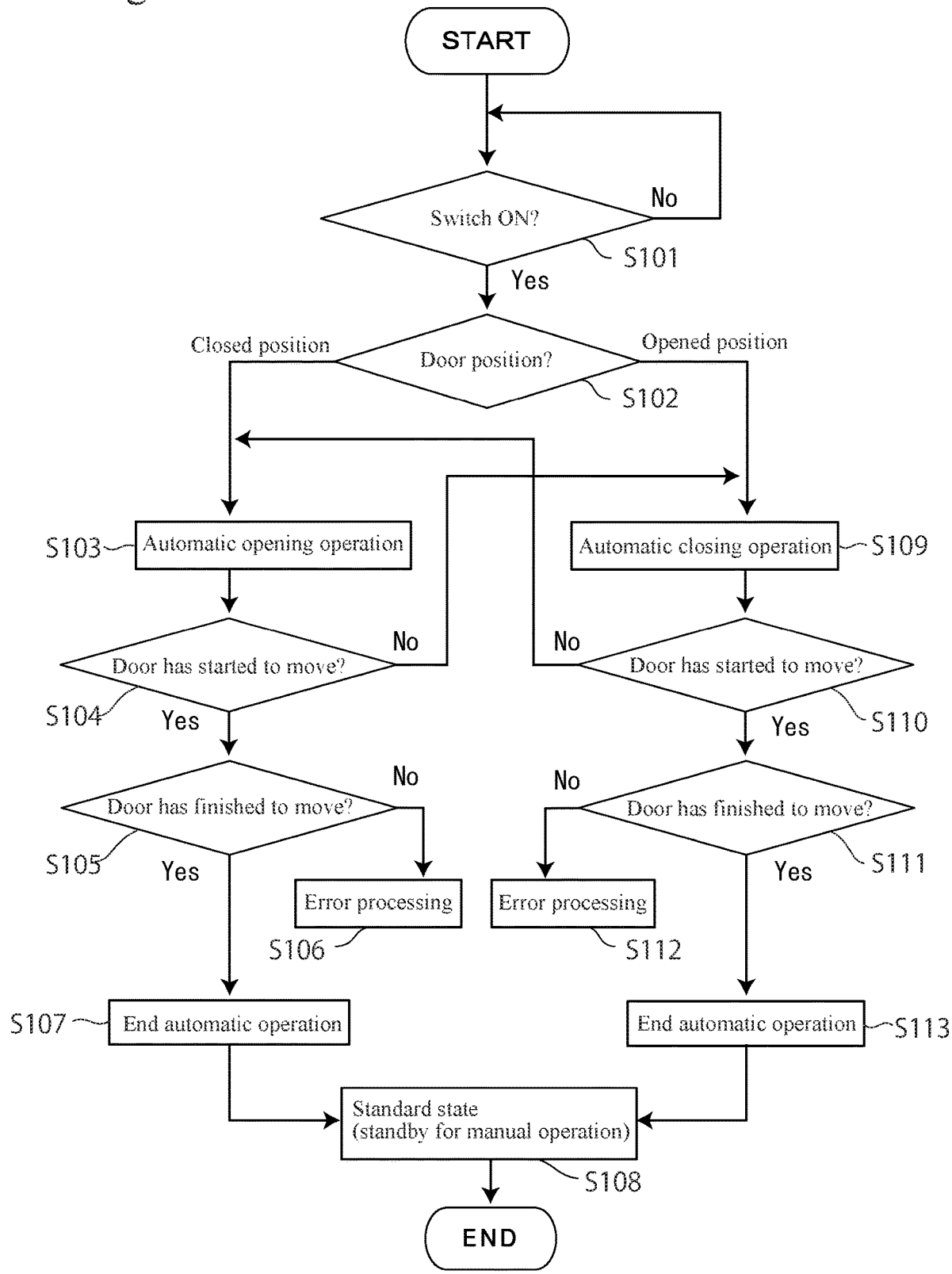
FIG. 8 is a flowchart of door opening and closing operations according to the embodiment.

Next, a flow of opening and closing operations of the door 11 is described with reference to the flowchart in FIG. 8.

In Step S101, from the infrared sensor 36 of the control panel 35, which is a switch to open and close the door 11, a command signal to open/close the door 11 is input. When the signal is not input, the mechanism waits until the signal is input.

When a command is input, the process shifts to Step S102, and whether the door position is at a closed position or an open position is checked. In the present embodiment, the control unit 34 keeps a last opening/closing operation of the door 11 in memory, and makes determination according to the content.

First, a case where the door 11 is at the closed position (Steps S103 to S108) is described.

The process shifts to Step S103, and in order to open the door 11 that is at the closed position, the "automatic opening operation" for the door 11 is performed. In detail, the second one-way solenoid valve 66B is closed, and operation of the second pressurization pump 62B is started. At this time, the first one-way solenoid valve 66A is left open, and the first pressurization pump 62A is not activated (refer to FIGS. 6 and 7).

Next, the process shifts to Step S104, and whether the door 11 has started to move is checked. When the door 11 starts to move, the air pressure rapidly decreases, so that when a value of the second pressure sensor 64B rapidly decreases within a predetermined time, for example, within one second, it is determined that the door 11 has started an opening operation. When the door 11 does not start to move within the predetermined time, the control unit 34 determines that "door 11 has already been opened," and the process shifts to Step S109, and then, the "automatic closing operation" is started (described later). Alternatively, when a value of the second pressure sensor 64B exceeds a predetermined value, it is also possible to determine that the door has not started to move. A last position of the door 11 is kept in memory, however, in the present embodiment, manual opening and closing are also possible, and the position of the door 11 is moved by a user in some cases. Against such a case or an erroneous determination of the door 11 position, security is provided by this Step S104.

When movement of the door 11 is started, the process shifts to Step S105, and whether the opening operation of the door 11 has been finished is checked. When the movement of the door 11 is completed, the air pressure increases again, and when a value of the second pressure sensor 64B increases again within a predetermined time, it is determined that the opening operation of the door 11 has been finished. When the value of the second pressure sensor 64B does not increase within the predetermined time, air leakage or malfunction is suspected, so that to perform error handling, the process shifts to Step S106.

In Step S106, as the error handling, a warning tone is produced, an error is displayed on the display unit 38, the operation of the second pressurization pump 62B is stopped, the second one-way solenoid valve 66B is opened, and the mechanism is brought to an emergency stop.

When completion of the opening operation of the door 11 is confirmed according to an air pressure increase, the process shifts to Step S107, the operation of the second pressurization pump 62B is stopped, the second one-way solenoid valve 66B is opened, and the automatic operation is normally finished.

Last, the process shifts to Step S108, the mechanism returns to the standard state, and manual opening and closing are enabled.

Next, a case (S109 to S113) where the door 11 is at the open position in Step S102 is described.

The process shifts to Step S109, and in order to close the door 11 that is at the open position, the "automatic closing operation" for the door 11 is performed. In detail, the first one-way solenoid valve 66A is closed, and operation of the first pressurization pump 62A is started. At this time, the second one-way solenoid valve 66B is left open, and the second pressurization pump 62B is not activated (refer to FIGS. 6 and 7).

Next, the process shifts to Step S110, and whether the door 11 has started to move is checked. As in Step S104, when a value of the first pressure sensor 64A rapidly decreases within a predetermined time, it is determined that the door 11 has started a closing operation. When the door 11 does not start to move within the predetermined time, the control unit 34 determines that "the door 11 has already been closed," and the process shifts to Step S103, and then, the "automatic opening operation" is started. Like Step S104, this step S110 also provides security against a case where the door 11 position is moved by manual opening and closing and an erroneous determination.

When movement of the door 11 is started, the process shifts to Step S111, and whether the closing operation of the door 11 has been finished is checked. Completion of the movement of the door 11 is determined when the value of the first pressure sensor 64A increases again within a predetermined time. When the value of the first pressure sensor 64A does not increase within the predetermined time, to perform error handling again, the process shifts to Step S112. When completion of the door closing operation is confirmed according to an increase in value of the first pressure sensor 64A within the predetermined time, the process shifts to Step S113.

In Step S112, as error handling, a warning tone is produced, an error is displayed on the display unit 38, the operation of the first pressurization pump 62A is stopped, the first one-way solenoid valve 66A is opened, and the mechanism is brought to an emergency stop.

When an increase in value of the first pressure sensor 64A within the predetermined time is confirmed, the process shifts to Step S113, the operation of the first pressurization pump 62A is stopped, and the first one-way solenoid valve 66A is opened.

Last, the process shifts to step S108, the mechanism returns to the standard state, and manual opening and closing are enabled.

Step S111 and Step S105 double as a safety function to prevent finger pinching, etc. When the door 11 is about to be automatically closed or opened, even if one of the operator's fingers is pinched in the door 11, a specimen or the like is caught in the door 11, or trouble occurs in the movement of the door 11 and the movement is forcibly stopped, the air pressure increases, so that this air pressure increase is detected by the first pressure sensor 64A (or the second pressure sensor 64B), and the operation of the door 11 is immediately stopped, both of the one-way solenoid valves (66A and 66B) are made to communicate with the atmosphere, and the load on the door 11 is eliminated, and safety is secured.

(Attaching and Detaching Mechanism)

Figure 9:
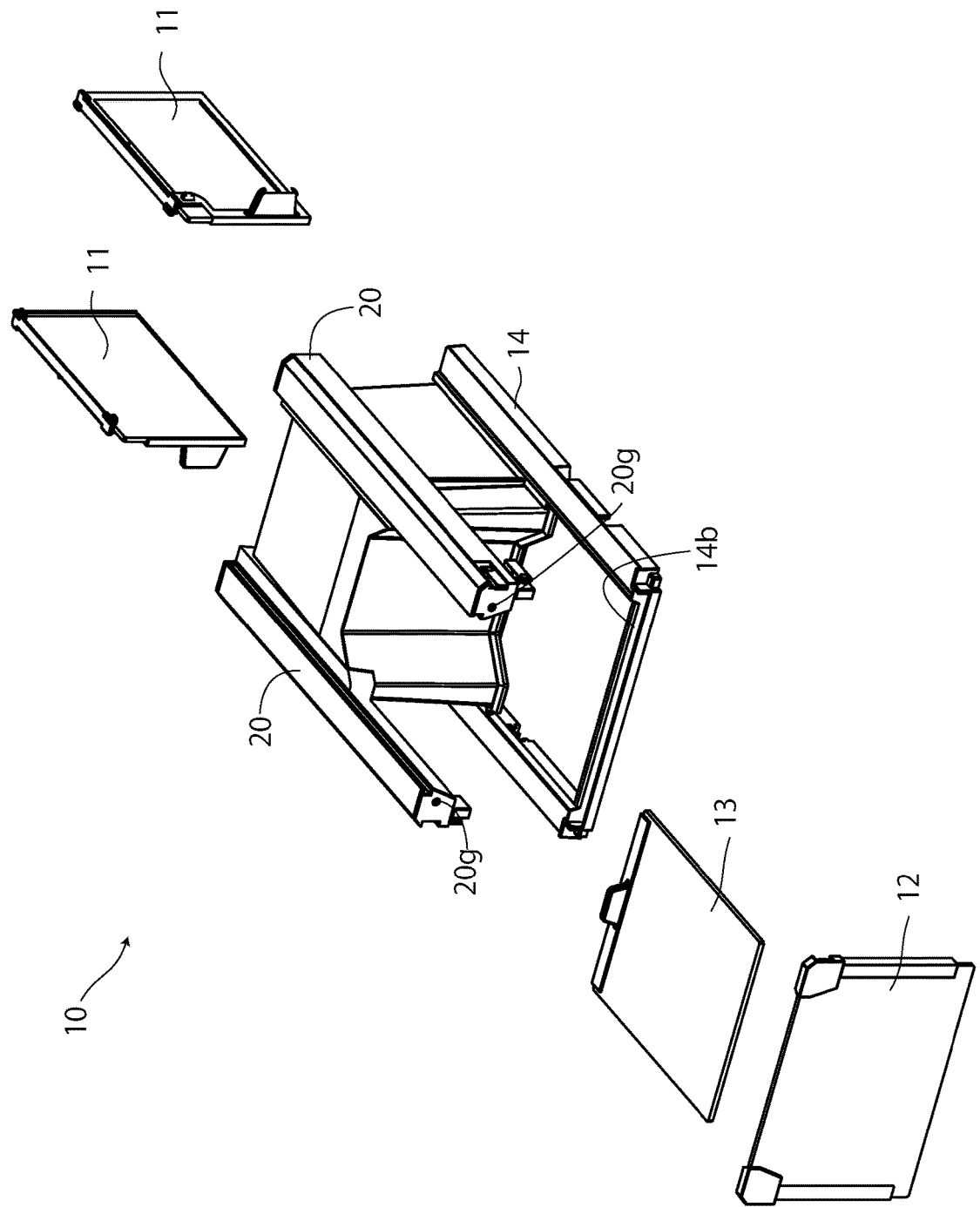
FIG. 9 is an exploded perspective view of the windshield.

Next, an attaching and detaching mechanism of the door of the windshield 10 configured as described above will be described. FIG. 9 is an exploded perspective view of the windshield 10. As illustrated in FIG. 9, all of the front glass 12, the left and right doors 11, and the upper surface door 13 provided in the windshield 10 are configured to be detachable.

Figure 10:
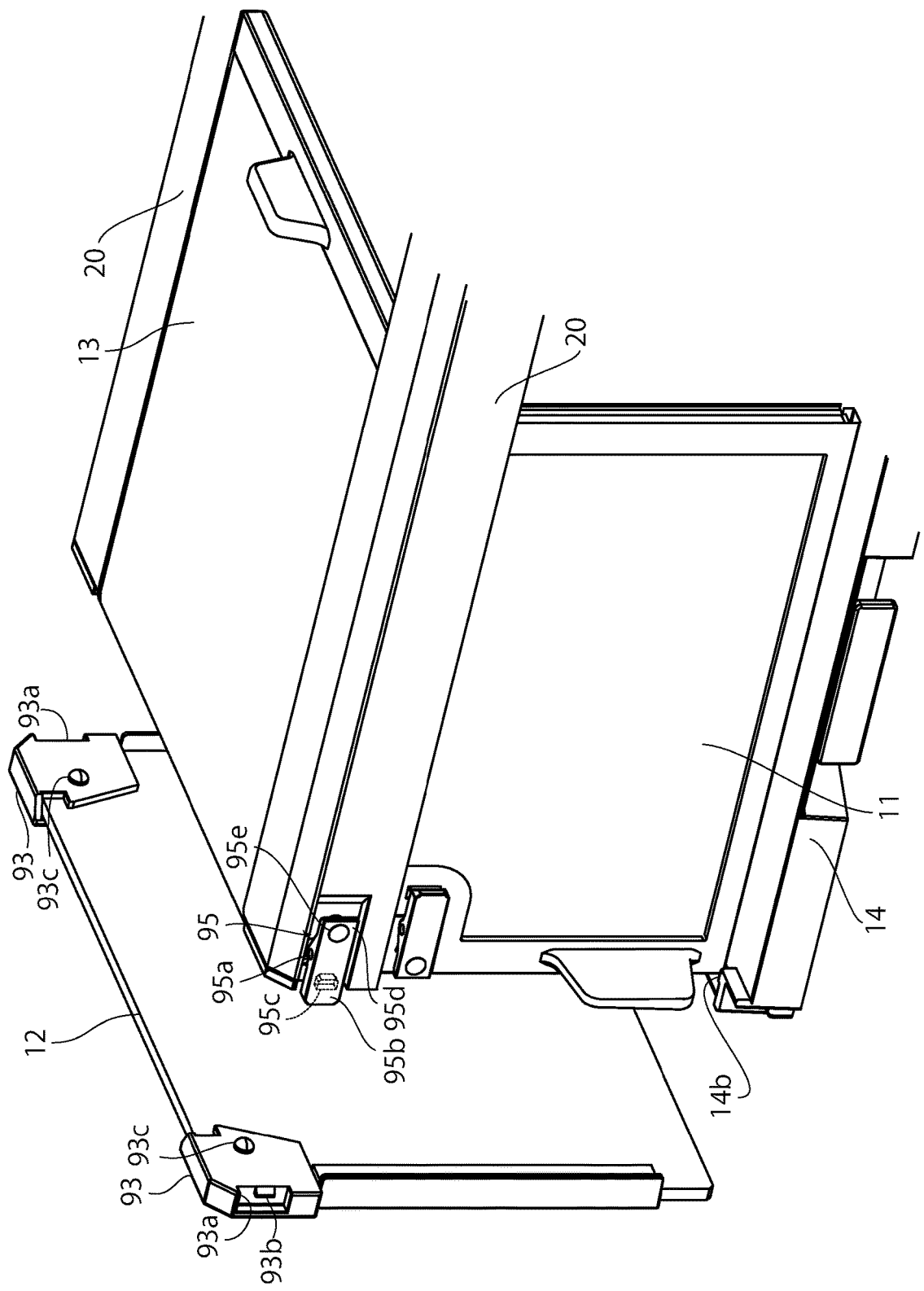
FIG. 10 is an explanatory view illustrating a front glass connection mechanism.

FIG. 10 illustrates a state where the front glass 12 has been detached from the windshield 10. At left and right corners of the upper portion of the front glass 12, to-be-latched members 93 are provided. The to-be-latched members 93 clamp the front glass 12 from the front and rear sides and are firmly fixed, and will not fall off the front glass 12.

At the front part of a side surface of each cylinder box 20, a second latching member 95 provided for latching the front glass 12 is disposed in a recess portion formed at the front part of the side surface of the cylinder box 20. A latch portion 95b that is a front end portion of the second latching member 95 is in a state of being projected from the front surface of the cylinder box 20.

The second latching member 95 is a tabular clip structure having a point of load at a front end side and a point of effort at a rear end side, and is supported turnably by a shaft 95a extending vertically at the center in the longitudinal direction (front-rear direction), and the latch portion 95b that is the front end portion is biased inward by an elastic member not illustrated.

The inner side of the latch portion 95b is chamfered so that the latch portion becomes thinner forward. Further, on the inner side of the latch portion 95b, a fitting recess portion 95c is formed.

In a side surface of the to-be-latched member 93, a guide groove 93a is provided by matching a disposed position of the second latching member 95, and on a bottom surface of the guide groove 93a, a fitting projecting portion 93b that engages with the fitting recess portion 95c is formed.

When attaching the front glass 12, first, only by fitting the bottom surface of the front glass 12 in a groove 14b (refer to FIGS. 9 and 10) formed at a front edge portion of the lower frame 14 and pushing the upper portion toward the cylinder box 20, the second latching members 95 (specifically, the projecting latch portions 95b) are guided into the guide grooves 93a, and the fitting recess portions 95c on the inner sides of the second latching members are fitted to the fitting projecting portions 93b to fix the front glass 12.

The fitting projecting portion 93b has an inclined surface continuing from an end portion so that the second latching member 95 is smoothly guided, and the inner side of the latch portion 95b that is the front end portion of the second latching member 95 is chamfered, and accordingly, the front glass 12 can be easily smoothly latched with a single touch by being guided by the fitting projecting portions 93b and the second latching members 95.

Projections 93c provided on back surfaces of the to-be-latched members 93 are also engaged with recesses 20g provided on front surfaces of the cylinder boxes 20 and assist with positioning of the front glass 12.

When detaching the front glass 12, by pushing end portions 95d that are rear end portions on the opposite side of the latch portions 95b that are front end portions, the latch portions 95b come off and the fitting is released.

The second latching members 95 are biased by elastic members not illustrated, so that the front glass 12 is firmly latched, and there is no risk that fitting is released by mistake and the front glass 12 falls off during use of the windshield 10. The front glass 12 is fitted in the groove 14b, and is latched at upper portion left and right positions by the second latching members 95, so that a worker can detach the front glass 12 only by directly facing the windshield 10, holding the left and right second latching members 95 by both hands, and in this state, tilting the front glass 12 forward. Marks 95e slightly standing out are provided on surfaces of the end portions 95d, and a worker can easily find the end portions 95d even by groping and can detach the front glass 12 by holding the end portions 95d, so that the workability is excellent. The front glass 12 is fitted in the groove 14b, so that there is no risk that the front glass 12 falls off by mistake during the detaching work.

As illustrated in FIG. 9, by detaching the front glass 12, the upper surface door 13 can be removed by being slid forward. The rear end sides of the rails 20a that guide movement of the upper surface door 13 are not opened due to stoppers provided at the rear end sides for preventing falling off during normal use. The front end sides of the rails 20 are open, but in normal use, the front glass 12 is disposed at the front end sides, and the upper surface door 13 that has been slid comes into contact with the front glass 12 and hence does not fall off.

Figure 11A:
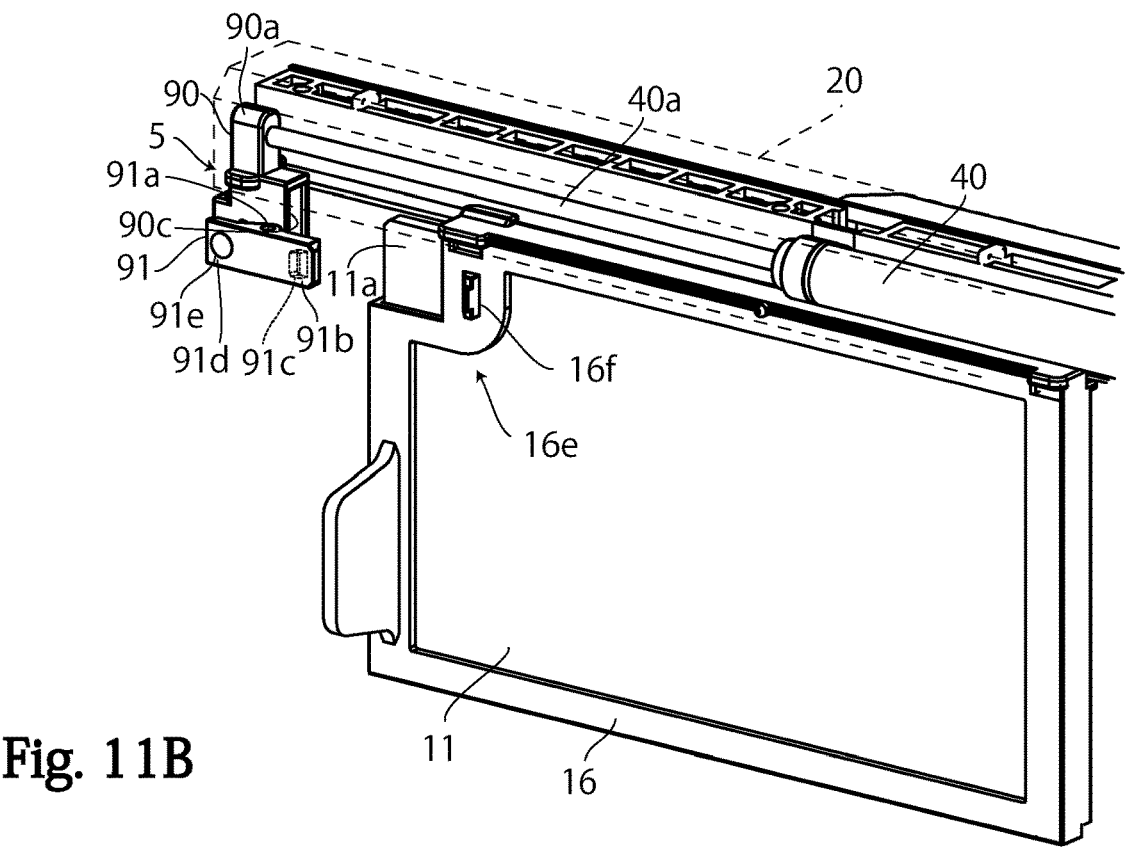
FIGS. 11A and 11B are explanatory views illustrating a door connection mechanism.
Figure 11B:
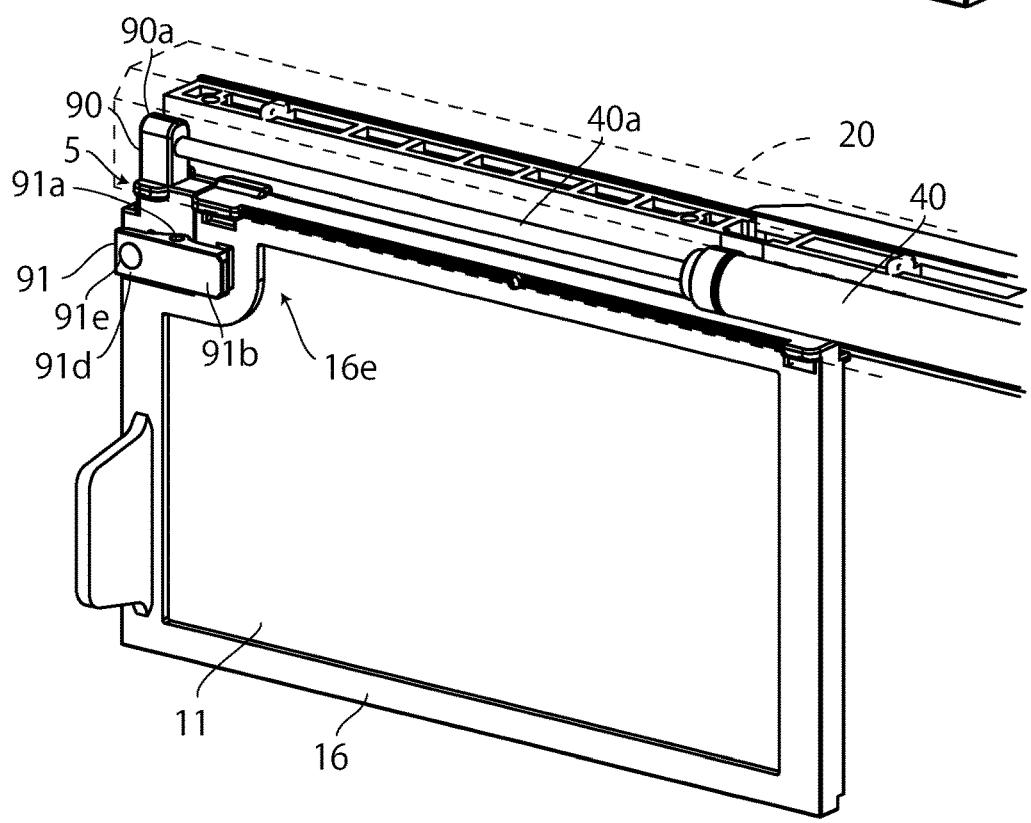

Next, the attaching and detaching mechanism of the door 11 will be described. FIG. 11 illustrate a joined state between the door 11 and the joint member 90, and FIG. 11(A) illustrates a state where joining between the door 11 and the joint member 90 is released, and FIG. 11(B) illustrates a state where the door 11 and the joint member 90 are joined. To clearly illustrate the joining state, as the cylinder box 20, only an external form of the cylinder box is illustrated with dashed lines.

As illustrated in FIG. 11(A), a to-be-joined portion 16e is provided at a corner of an upper front side of the holder 16 holding the door 11. The to-be-joined portion 16e is formed so as to expose a corner portion 11a of the door 11. That is, the holder 16 does not extend at its front edge portion to an upper end of the door 11 but extends rearward before the upper end, and further extends upward again to the upper end to be connected to an upper edge portion, and thus the to-be-joined portion 16e is formed so as to avoid the corner portion 11a of the upper front side of the door 11. On the surface of the to-be-joined portion 16e, a fitting projecting portion 16f is formed.

The first latching member 91 provided on the joint member 90 has a configuration equivalent to the configuration of the second latching member 95, and is attached in a direction opposite to the second latching member 95. That is, the first latching member 91 is a clip structure with the same configuration, and a front end portion is an end portion 91d serving as a point of load, and a rear end portion is a latch portion 91b serving as a point of effort. As with the second latching member 95, the first latching member 91 is supported turnably by a shaft 91a, and the latch portion 91b is biased inward by an elastic member not illustrated. On the inner side of the latch portion 91b, a fitting recess portion 91c that fits the fitting projecting portion 16f is formed.

When the door 11 is slid forward from the state illustrated in FIG. 11(A), the corner portion 11a that is not covered by the holder 16 but exposed enters a slit 90c formed in a rear side surface of the joint member 90, and the fitting projecting portion 16f of the to-be-joined portion 16e is fitted in the fitting recess portion 91c, and the door 11 is joined to the joint member 90. Accordingly, the door 11 is integrated with the joint member 90, and moves by being driven by the piston rod 40a joined to the joint member 90.

When detaching the door 11, as with the front glass 12, fitting is released only by pushing the end portion 91d with the mark 91e of the second latching member 95, and joining between the door 11 and the joint member 90 is released. The rear end portion of the guide hole 20d is open, so that by sliding the door 11 rearward in this state, the door 11 can be detached from the windshield 10.

As with the second latching member 95, when attaching the door 11, only by sliding the door 11 forward, the latch portion 91b gets over the fitting projecting portion 16f and is naturally engaged by biasing by the elastic body not illustrated, so that the door 11 can be attached with a single touch, and detaching of the door is also easy.

As described above, the joint member 90 is disposed in a state where the driving mechanism coupling portion 90a is inserted through the guide hole 20d and enters the inside of the cylinder box 20. To the driving mechanism coupling portion 90a, the tip end of the piston rod 40a is fixed, and accordingly, the door 11 is joined to the air cylinder 40 through the joint member 90 and is automatically opened and closed.

The driving mechanism coupling portion 90a includes the holding portion 5, and slidably supports the joint member 90 by the guide hole 20d in a hanging manner, while a portion lower than the driving mechanism coupling portion 90a is exposed from the guide hole 20d to the outside of the windshield. The joint member 90 is joined to the door 11 by the first latching member 91 that is in this exposed portion.

Conventionally, the driving mechanism of the door of the windshield was incorporated inside for preventing malfunction, so that the door to be joined to this driving mechanism was difficult to detach. In the present embodiment, the air cylinder 40 serving as a driving mechanism is disposed inside the cylinder box 20 so as not to allow a user to touch it to prevent malfunction, and by exposing a portion of the joint member 90 to be joined to the air cylinder 40 (piston rod 40a) to the outside and joining the exposed portion to the door 11, joining/releasing between the air cylinder 40 and the door 11 are made easy.

The door 11 is a sliding mechanism that is supported in a hanging manner by the guide hole 20d and moves along the guide hole 20d, and when joining to the joint member 90 is released, the door can be easily detached through the guide hole 20d having a rear end portion opened.

A preferred embodiment of the present invention has been described above, and it can be modified according to knowledge of a person skilled in the art, and such modifications are included in the scope of the present invention.

REFERENCE SIGNS LIST

1 Balance with windshield
10 Windshield
11 Door
16 Holder
20d Guide hole
40 Air cylinder
90 Joint member
90a Driving mechanism coupling portion
91 First latching member

The invention claimed is:

1. A windshield having a door to be automatically opened and closed by a driving mechanism incorporated inside, comprising:

a joint member interposed between the driving mechanism and the door, and at least partially exposed to the outside of the windshield, wherein the door is configured to be detachable, and detachably joined to the joint member at an outside exposed portion of the joint member, and the door is opened and closed by the driving mechanism through the joint member.

2. The windshield for a balance according to claim 1, wherein the door is supported on a rail at least one end portion of which is open, and is configured to open and close by being driven by the driving mechanism to slide along the rail.

3. The windshield for a balance according to claim 1, wherein the driving mechanism is an air cylinder disposed parallel to an opening and closing direction of the door, and the joint member is joined to a piston rod of the air cylinder, and further, detachably joined to the door at the portion exposed to the outside from the windshield.

4. The windshield for a balance according to claim 1, wherein the door is supported in a hanging manner by a guide hole at least one end portion of which is open, and the joint member is disposed in a state where at least a portion of the joint member is inserted through the guide hole, and is joined at the portion inserted through the guide hole to the incorporated driving mechanism, and is joined at a portion not inserted through the guide hole to the door.

5. The windshield for a balance according to claim 2, wherein the driving mechanism is an air cylinder disposed parallel to an opening and closing direction of the door, and the joint member is joined to a piston rod of the air cylinder, and further, detachably joined to the door at the portion exposed to the outside from the windshield.

6. The windshield for a balance according to claim 2, wherein the door is supported in a hanging manner by a guide hole at least one end portion of which is open, and the joint member is disposed in a state where at least a portion of the joint member is inserted through the guide hole, and is joined at the portion inserted through the guide hole to the incorporated driving mechanism, and is joined at a portion not inserted through the guide hole to the door.

7. The windshield for a balance according to claim 3, wherein the door is supported in a hanging manner by a guide hole at least one end portion of which is open, and the joint member is disposed in a state where at least a portion of the joint member is inserted through the guide hole, and is joined at the portion inserted through the guide hole to the incorporated driving mechanism, and is joined at a portion not inserted through the guide hole to the door.

* * * * *